Nov. 12, 1957  G. PAVLINETZ  2,812,527
METHOD OF MAKING WINGED CAP NUTS
Filed Sept. 14, 1954  2 Sheets-Sheet 1
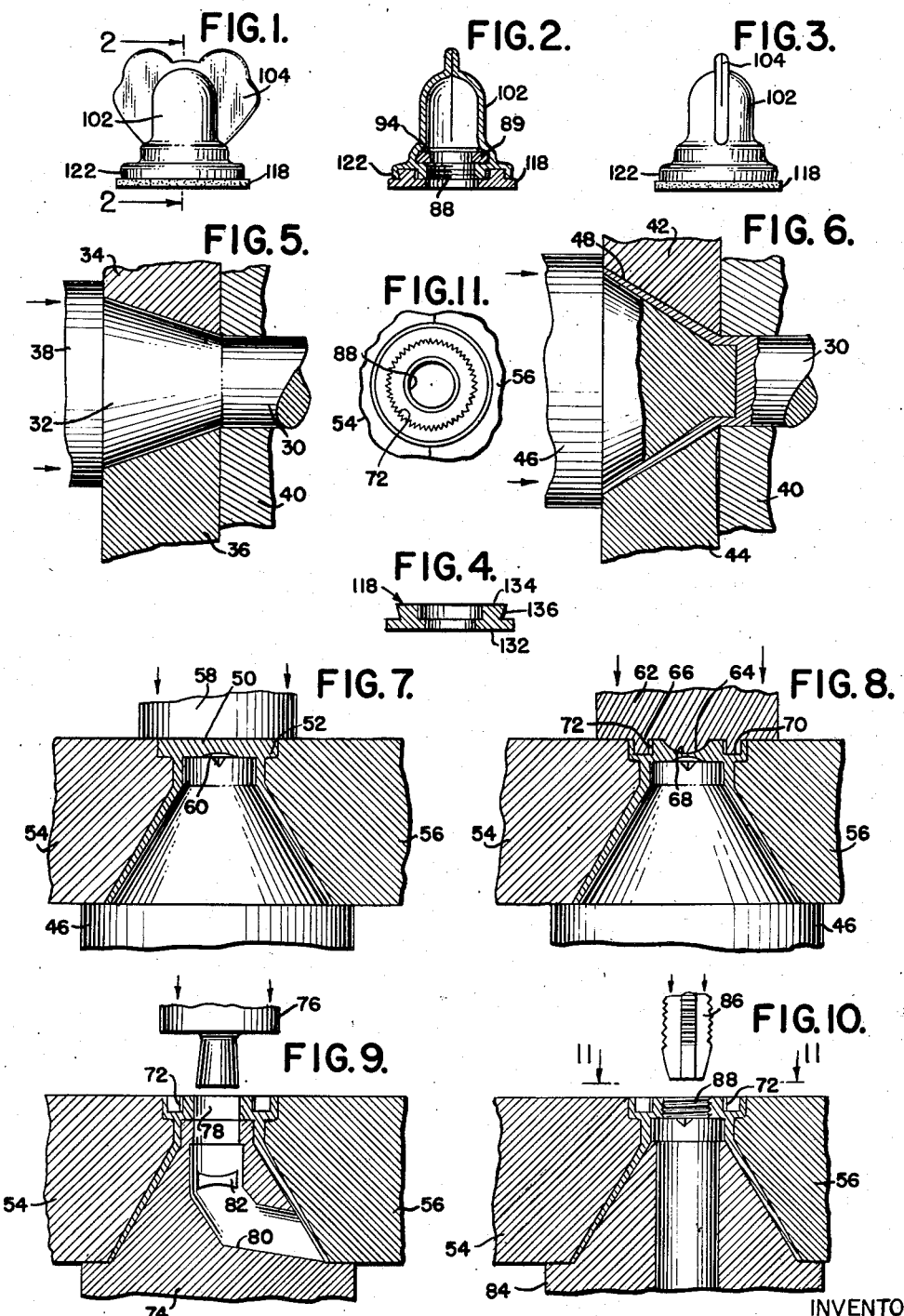
INVENTOR
George Pavlinetz
BY
ATTORNEY Nov. 12, 1957     G. PAVLINETZ     2,812,527
METHOD OF MAKING WINGED CAP NUTS
Filed Sept. 14, 1954     2 Sheets-Sheet 2

INVENTOR
George Pavlinetz
BY *Raymond W. Colton*
ATTORNEY

United States Patent Office 2,812,527
Patented Nov. 12, 1957

2,812,527

METHOD OF MAKING WINGED CAP NUTS

George Pavlinetz, Carteret, N. J.

Application September 14, 1954, Serial No. 455,892

9 Claims. (Cl. 10—86)

This invention relates to winged fasteners and methods of making the same and is particularly concerned with winged fasteners provided with one or more grooves adapted to receive friction members of various types.

It is preferred that the winged fastener be produced from rod stock by heading the stock and forming a hollow divergent body closed at its smaller base, threading the base, and collapsing portions of the body remote from the base about a mandrel forming an annular wall having opposed wings. It is also preferred that the annular wall so formed be converged to form a closed end or cap remote from the base.

In producing such winged fasteners in the form of nuts, the base is pierced and then internally threaded. The rod stock is preferably headed to substantially frusto-conical shape and then cupped to produce the hollow divergent body. The base is axially grooved where a friction member or washer is to be applied thereto. This is accomplished by forging the base to form walls defining the groove, partially inserting a washer in the groove and then deforming at least one of the walls to retain the washer. One of such walls may be rendered non-circular or toothed to restrain the washer against rotation relative to the winged fastener itself. In certain forms, the body is radially grooved to receive a friction member or collar in which case, the collar is preferably positioned within the body prior to the collapsing operation and the body is then deformed to retain the collar against relative movement with respect thereto.

The resulting winged fastener comprises a hollow body preferably closed at one end, and threaded at the other, there being opposed wings projecting from the closed end and integral walls adjacent to and coaxial with the threaded end defining a groove, a friction member received in the groove, and one of the walls securing the friction member against relative movement. As already indicated, such groove may be radial or axial or both types of grooves can be and are preferably provided, each receiving such a friction member, such as an annular fiber member, or one composed of soft metal.

Under certain conditions, it may be desirable to permit relative rotation of the friction member or members, in which case the rotation restraining elements will be omitted. In accordance with the present invention, drilling, reaming, casting and welding are avoided, a long die life is achieved and a relatively inexpensive operation and product are possible where any appreciable production is involved.

A more complete understanding of the invention will follow from a description of the accompanying drawings wherein:

Fig. 1 is a front elevation of a completed winged nut produced in accordance with the present invention;

Fig. 2 is a sectional elevation taken along line 2—2 of Fig. 1;

Fig. 3 is a side elevation of the same article;

Fig. 4 is a sectional elevation of the base friction member;

Figs. 5, 6, 7, 8, 9, 10, 12, 13, 14, 15, 16 and 17 are elevations, partially in section depicting the steps employed in producing the winged fastener;

Figure 18:
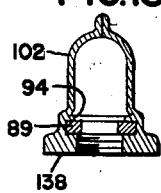
Figure 19:
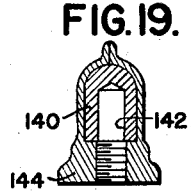
Figure 20:
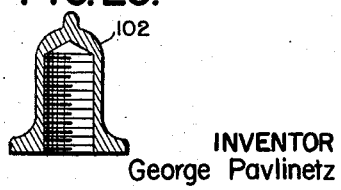

Fig. 11 is a plan view taken along line 11—11 of Fig. 10 depicting a fragment thereof; and Figs. 18, 19 and 20 depict modifications of the article shown by Figs. 1, 2 and 3.

Starting with a rod 30, it is provided with a head 32 of frusto-conical shape between the separable dies 34 and 36 and a male die 38 in conjunction with an anvil 40 through which the rod is fed.

Next the headed portion is cupped in accordance with the operation depicted in Fig. 6 where the separable dies 42 and 44 cooperate with the male die 46 to produce a skirt 48 diverging from the closed end of the rod but having a wall which in itself converges in that direction.

The work piece is then parted from the rod to provide a closed end 50 which is then forged to provide an overhanging flange 52 between the male die 46, separable dies 54 and 56 and a die 58. During this operation as depicted in Fig. 7, the inner surface of the closed end wall 50 can receive a depression 60 by the substitution of a suitable die for the male die 46.

As depicted in Fig. 8, the work is retained between the same dies 46, 54 and 56 but a new male ram die 62 is employed whose machined end provides a central convexity 64 surrounded by a coaxial rib 66. The convexity produces a concave depression 68 in the closed end of the work piece and a coaxial annular groove 70 whose inner wall is simultaneously formed with serrations or teeth 72 more clearly shown in Fig. 11.

As shown in Fig. 9, shearing dies 74 and 76 have been substituted for the dies 46 and 62 respectively, for piercing the work centrally to define an opening 78 in the smaller end thereof. The die 74 provides an opening 80 to receive the punching 82 removed in forming the opening 78.

As shown in Fig. 10, a male die 84 is substituted for the die 74 for cooperation with a tap 86 employed to form threads 88 in the opening 78 previously produced.

Figure 12:
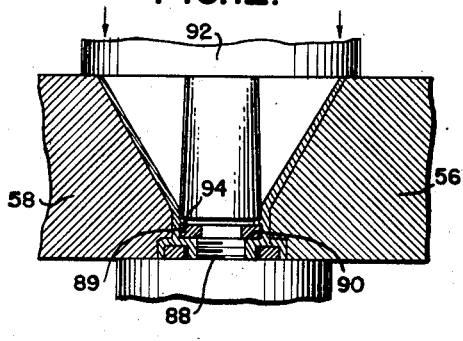

A fiber collar 89 is introduced into the flared open end of the work piece and seated on a shoulder 90 adjacent the threads just formed. Then, as depicted in Fig. 12, a male die 92 forms an annular flange 94 integral with the inner wall of the work piece to retain the collar 89 against axial or rotational movement relative to the threads 88.

Figure 13:
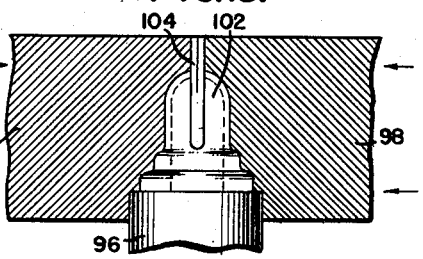
Figure 14:
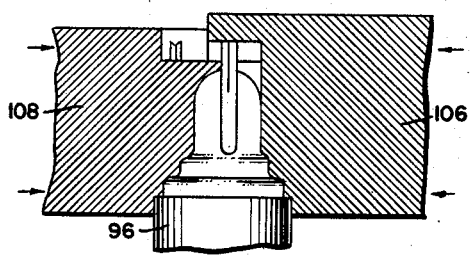
Figure 15:
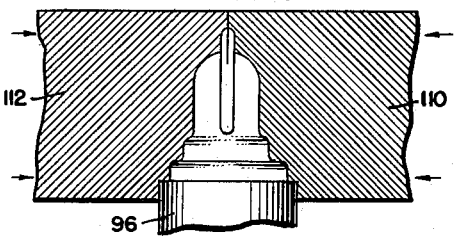
Figure 16:
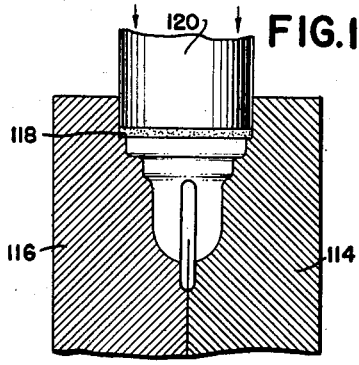

The work piece is now applied to a mandrel 96 as shown in Fig. 13 and its upper portion is collapsed by means of dies 98 and 100 to form a wall 102 of circular section provided with opposed wings 104. While still mounted on the mandrel, these wings are sheared to their desired shape, as shown in Fig. 14, by means of dies 106 and 108 and then rounded, as depicted in Fig. 15 by means of cooperating dies 110 and 112.

The winged fastener thus far completed, is mounted between chuck jaws 114 and 116 while a fiber washer 118 is introduced into the groove 70 in engagement with the serrations 72 by means of the ram 120.

Figure 17:
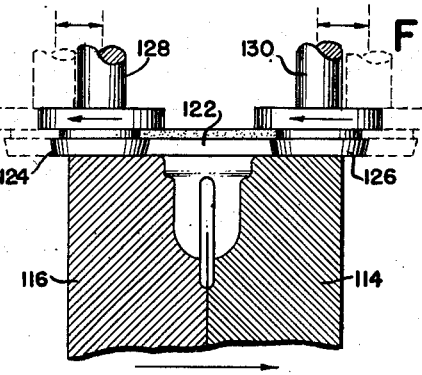

Then, as depicted in Fig. 17, the outer wall 122 defining the groove 70 is deformed by means of rollers 124 and 126 carried by shafts 128 and 130 respectively.

The fiber member 118, as shown in Fig. 4, includes a base portion 132 for engagement with a surface to which the completed fastener is to be applied and a reduced upper end 134 for reception in the groove 70. The outer wall 136 of the reduced portion diverges slightly from the base 132 to effect a locking action with the outer wall 122 of the base when it is swaged or otherwise deformed in the manner shown in Fig. 17.

The modification depicted in Fig. 18 differs from the construction of Fig. 2 primarily in the provision of a solid base portion 138.

The nut depicted in Fig. 19 can be produced with some of the method steps described with reference to the product of Fig. 2, omitting others. It is contemplated that the fiber member 140 of Fig. 19, be solid initially for introduction as a mandrel in lieu of the die 92 of Fig. 12 and then, after the other steps have been completed, the fiber member can be drilled to provide an opening 142 for engagement with the forward end of a screw to which the nut is applied. Here again, the nut is provided with a solid base 144 although it might well assume another form.

Fig. 20 depicts still another modification involving neither a fiber collar nor a fiber base but illustrating a nut produced from solid stock and requiring no cupping operations.

It is contemplated that the frusto-conical portion of the partially completed work piece be coated with a thermoplastic material so as to produce a protective coating for the internal portions of the product, defining a seal.

Instead of forming the fiber body of Fig. 19 in the manner already described, the nut can be formed in the manner described with reference to the product of Fig. 2, employing the die 92 of Fig. 12 and then producing with a moldable plastic material, a suitable friction member such as the fiber member 140 by molding it in place.

The base friction member or washer 118 will thus produce a seal, will promote a cushioning action and will effect such frictional engagement with a surface as to assist in securing the parts together. The thread locking action will of course, result from the engagement of the collar or friction member 89 with the threads of a screw, it being understood of course that the diameter of the opening through the collar 89 will be somewhat less than that of the threads 88.

It will be understood of course, that the base of the winged fastener or any intermediate portion thereof can be polygonal, by the use of appropriate dies or by starting with a rod of appropriate shape, to provide wrench engaging surfaces.

Although a limited number of modifications have been discussed and illustrated, the invention should not be restricted thereto beyond the scope of the appended claims.

I claim:

1. A method of making winged fasteners from rod stock comprising heading said stock and punch forming therefrom by a forging operation a hollow divergent body closed at its smaller base, separating said body from said stock, forming an opening through and threading said base, and collapsing portions of said body remote from said base about a mandrel forming an annular wall having opposite wings.

2. A method as set forth in claim 1 wherein said base is first pierced and then internally threaded.

3. A method as set forth in claim 1 wherein said stock is headed to substantially frusto-conical shape.

4. A method as set forth in claim 1 wherein subsequent to said punch-forming operation said base is axially grooved by a forging operation to receive a washer.

5. A method as set forth in claim 1 wherein said base is forged to form walls defining an axial groove, a washer is partially inserted in said groove, and one of said walls is deformed to retain said washer.

6. A method as set forth in claim 1 wherein subsequent to the formation of said opening said body is deformed between dies to produce an internal radial collar-retaining groove.

7. A method as set forth in claim 1 wherein a collar is positioned within said body prior to said collapsing operation and said body is then deformed to retain said collar.

8. A method as set forth in claim 1 wherein said annular wall is converged to form a closed end remote from said base.

9. A method as set forth in claim 1 wherein said base is forged to form dissimilar walls defining a groove to receive and retain a washer against relative rotation.

References Cited in the file of this patent

UNITED STATES PATENTS

| | | |
|---|---|---|
| 2,018,301 | Ferry | Oct. 22, 1935 |
| 2,288,710 | Hotchkin | July 7, 1942 |
| 2,399,090 | Ballak | Apr. 23, 1946 |
| 2,614,274 | Moore | Oct. 21, 1952 |